United States Patent
Shirai et al.

[11] Patent Number: 5,850,309
[45] Date of Patent: Dec. 15, 1998

[54] MIRROR FOR HIGH-INTENSITY ULTRAVIOLET LIGHT BEAM

[75] Inventors: Takeshi Shirai, Kawashaki; Junji Aboshi, Sagamihara, both of Japan

[73] Assignee: Nikon Corporation, Tokyo, Japan

[21] Appl. No.: 828,220

[22] Filed: Mar. 27, 1997

[30] Foreign Application Priority Data

Mar. 27, 1996 [JP] Japan .................................... 8-072749
Dec. 2, 1996 [JP] Japan .................................... 8-321421

[51] Int. Cl.$^6$ .............................. G02B 5/28; G02B 1/00; H01S 3/08; F21V 9/06
[52] U.S. Cl. ......................... 359/360; 359/584; 359/585; 359/589; 372/99
[58] Field of Search .................................... 359/360, 359, 359/584, 585, 589; 372/99

[56] References Cited

U.S. PATENT DOCUMENTS

| | | | |
|---|---|---|---|
| 4,714,308 | 12/1987 | Sawamura et al. | 359/360 |
| 4,856,019 | 8/1989 | Miyata et al. | 359/585 |
| 5,424,876 | 6/1995 | Fujii | 359/584 |
| 5,506,037 | 4/1996 | Tremath | 359/585 |

FOREIGN PATENT DOCUMENTS

| | | | |
|---|---|---|---|
| 295933 A5 | 11/1991 | Germany | 359/359 |
| 2-038924 | 9/1990 | Japan . | |

*Primary Examiner*—Jon W. Henry
*Attorney, Agent, or Firm*—Klarquist Sparkman, Campbell Leigh & Whinston, LLP

[57] ABSTRACT

A mirror for, e.g, an excimer laser is disclosed having high reflectance for a broad band of wavelengths in the ultraviolet range exhibiting excellent adhesion and "laser durability." The mirror comprises a substrate formed from glass or a glass-like material, a dielectric film, and a metallic film, such as aluminum foil, positioned between the dielectric film and the substrate. The dielectric film includes alternating layers of high- and low-refractive index material. These alternating layers reduce the amount of incident light reaching the metallic film so that any damage to the metallic film caused by light is reduced, thereby increasing the laser durability of the mirror. The laser durability is also increased because the durability of the laminated dielectric film is generally superior to that of the metallic film used in prior-art metallic reflector mirrors.

24 Claims, 10 Drawing Sheets

MIRROR FOR HIGH-INTENSITY ULTRAVIOLET LIGHT BEAM

FIELD OF THE INVENTION

This invention pertains to mirrors for reflecting excimer laser or other high-intensity ultraviolet (UV) light.

BACKGROUND OF THE INVENTION

Excimer lasers are used in a variety of applications, including photolithography. A mirror used in an excimer laser plays an important role in the overall efficiency and effectiveness of the laser. Ideally, when light reflects from a mirror, 100% of the incident wave is reflected. In actuality, however, mirrors typically absorb some percentage of the incident light, reducing the efficiency of the laser. The mirror's reflectance (i.e., ratio of intensity of reflected light to intensity of incident light) may also be a function of the angle of incidence or the wavelength of the incident light wave.

Generally, three types of excimer laser mirrors are currently known in the art. Each of these known mirrors contain at least one of the following deficiencies: (1) the reflectance is too low (e.g., 90% or less), (2) the reflectance is high, but only for a narrow wavelength band, and/or (3) the reflectance changes significantly with angle of incidence and/or wavelength.

FIG. 11 shows a first type of mirror that includes a substrate 11, made of glass or a glass-like material, a metallic aluminum film 13 bonded to the substrate surface, and a dielectric film 15 coated over the aluminum film 13 as a protective layer to prevent oxidation or other deterioration of the aluminum film.

FIGS. 12 and 13 show the reflection characteristics of the mirror of FIG. 11. Specifically, FIG. 12 shows the reflectance as a function of wavelength. Although the reflectance is somewhat uniform over a wide range of wavelengths, the reflectance is only about 90%, which is too low for many excimer laser applications.

FIG. 13 shows the reflectance as a function of incidence angle ($\theta$) with a laser wavelength of $\lambda$=193.4 nm. The reflectance at an incident angle between 0° and 40° is somewhat uniform, but again the reflectance is only about 90%.

The FIG. 11 structure also has low durability because the metallic aluminum film 13 tends to absorb excimer laser light causing the aluminum film 13 to peel away over time. The low durability is further caused by having only a single protective layer and poor adhesion between the substrate 11 and the metallic aluminum film 13.

FIG. 14 shows a second type of excimer laser mirror. This mirror has a structure in which a dielectric film 14 is laminated onto a substrate 11. The dielectric film 14 is formed from about 40 to 50 layers of alternating high- and low-refractive index material having an optical-film thickness of $\lambda$/4. The dielectric film 14 can exhibit a reflectance of over 95%, but only for wavelengths within a narrow band of approximately 20 nm.

FIGS. 15 and 16 show reflection characteristics of the mirror of FIG. 14. Specifically, FIG. 15 shows the percentage of reflectance as a function of wavelength. For wavelengths between about 185 nm and 205 nm (i.e., a 20-nm band), the mirror's reflectance exceeds 95%. But for applications requiring a range of wavelengths that exceed this narrow 20-nm band, the FIG. 14 structure is inadequate.

FIG. 16 shows reflectance as a function of angle of incidence with a laser wavelength $\lambda$=193.4 nm. Notably, the reflectance at incidence angles exceeding 20° sharply decreases, making the mirror of FIG. 14 ineffective for applications requiring an angle of incidence exceeding about 20°.

FIG. 17 shows a third conventional type of excimer laser mirror. This mirror structure is designed to exhibit the high reflectance of the FIG. 14 mirror, but for a broader wavelength band. The FIG. 17 structure includes two highly reflective dielectric layers 14, 14', with differing center wavelengths, sequentially laminated on a substrate 11.

FIGS. 18 and 19 show reflection characteristics of the mirror of FIG. 17. Specifically, FIG. 18 shows the reflectance as a function of wavelength. The reflectance is over 90% in a wavelength range between 180 nm and 210 nm, but exhibits a "dip" near the center of the reflectance band (i.e., at approximately 200 nm). The cause for this dip has been attributed to differences in reflectance of the p-polarized and s-polarized-light components depending on the wavelength and the angle of incidence.

FIG. 19 shows the reflectance as a function of angle of incidence with a laser wavelength $\lambda$=193.4 nm. Importantly, the reflectance temporarily drops at angles of incidence of between $\theta$=20° and 30°, and the reflectance drops sharply at angles of incidence greater than 40°.

Further problems with the FIG. 17 mirror is that it is susceptible to influences such as film absorption, scattering, and film strain because of its multiple layers (i.e., 80 to 100 layers) of film. As a result, this mirror has problems with layers tending to peel away. In addition, the multi-layer structure has high manufacturing costs.

SUMMARY OF THE INVENTION

In view of the foregoing shortcomings of the prior art, an object of the invention is to provide a mirror for an excimer laser or other intense UV light, wherein the mirror exhibits a reflectance of over 95%. A further object is to provide such a mirror that has a high reflectance for a bandwidth of approximately 30 to 40 nm or more in an excimer wavelength range of 160 nm to 300 nm. A yet further object is to provide such a mirror that exhibits little change in reflectance between s- and p-polarized light as the angle of incidence is changed. A still further object is to provide such a mirror that has good adhesion and "laser durability" (i.e., durability to exposure to high-intensity UV light, especially UV laser light such as excimer laser light).

The foregoing objects are attained by a mirror according to the present invention that comprises, according to a preferred embodiment, a substrate formed from glass or a glass-like material, a dielectric film, and a metallic film, such as aluminum, positioned between the dielectric film and the substrate. The dielectric film includes alternating layers of high- and low-refractive index material. These alternating layers reduce the amount of incident light that reaches the metallic film so that any damage to the metallic film caused by the light is reduced, and the mirror's laser durability is thereby increased. The mirror's laser durability is also increased because the durability of the laminated dielectric film is generally superior to that of the metallic film used in past metallic reflector mirrors.

According to one aspect of the invention, the alternating layers of the dielectric film have a film composition defined as:

$$n_{1L}(n_{1H} \cdot n_{2L})^j \cdot n_{1H} \cdot n_{1L} \cdot n_{2H}(n_{3L} \cdot n_{3H})^j \cdot n_{3L} \cdot n_{2H}$$

and by the relationships of the optical-film thicknesses being:

$$2n_{1L} \cdot d_{1L} = n_{1H} \cdot d_{1H} = n_{2L} \cdot d_{2L}$$

$$2n_{2H} \cdot d_{2H} = n_{3L} \cdot d_{3L} = n_{3H} \cdot d_{3H}$$

$$n_{1L} \cdot d_{1L} > n_{2H} \cdot d_{2H}$$

The terms $n_{1L}$, $n_{2L}$, and $n_{3L}$ denote the refractive indices of the low-refractive index layers, and $n_{1H}$, $n_{2H}$, and $n_{3H}$ denote the refractive indices of the high-refractive index layers. Each of the terms i, j is a positive integer denoting the respective coefficient of repetition of the alternating layers. The terms $n_{1L} \cdot d_{1L}$, $n_{1H} \cdot d_{1H}$, $n_{2L} \cdot d_{2L}$, $n_{2H} \cdot d_{2H}$, $n_{3L} \cdot d_{3L}$, and $n_{3H} \cdot d_{3H}$ denote the optical-film thicknesses of the layers having refractive indices $n_{1L}$, $n_{1H}$, $n_{2L}$, $n_{2H}$, $n_{3L}$, and $n_{3H}$, respectively.

According to another aspect of the invention, the dielectric film includes groups of alternating layers separated by at least one bonding layer. The film compositions of the alternating layers are defined by:

$$H_1(L_1H_1)^{a1}/L_1'/H_2(L_2H_2)^{a2}/\ldots/L_{n-1}'/H_n(L_nH_n)^{an}.$$

The terms $H_1$ through $H_n$ denote the high-refractive index layers in a first group through an nth group, and the terms $L_1$ through $L_n$ denote the low-refractive index layers in the first group through the nth group. The terms $L_1'$ through $L_{n-1}'$ denote the bonding layers in the first group through the (n−1)th group, and a1 through an are coefficients of repetition of the alternating layers. The alternating layers have an optical-film thickness defined by:

$$X_1 > X_2 > \ldots > X_n$$

$$Y_1 > Y_2 > \ldots > Y_{n-1}$$

wherein $X_1$ through $X_n$ denote the optical-film thicknesses of the various layers in the first group through the nth group, and $Y_1$ through $Y_{n-1}$ denote the optical-film thicknesses of the first bonding layer through the (n−1)th bonding layer.

In the foregoing aspects, it is preferable that the optical thickness of the alternating layers decrease with greater distance from the substrate.

The "laser durability" of the mirror can further be increased by forming a $\lambda/2$ low-refractive index layer as a topmost protective layer. The film thickness of this layer should exhibit good durability and minimize loss of optical characteristics.

The foregoing and additional features and advantages of the invention will be more readily apparent from the following detailed description, which proceeds with reference to the accompanying drawings.

DETAILED DESCRIPTION

Figure 1:
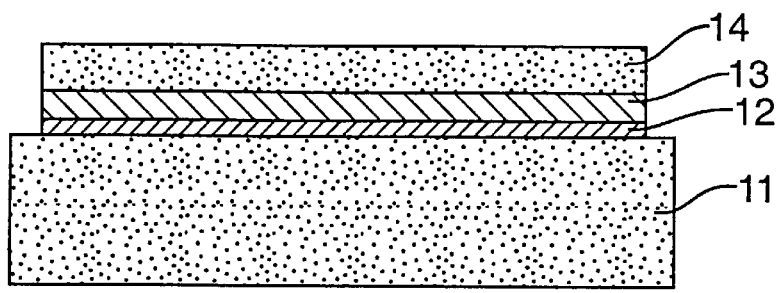
FIG. 1 is a cross-sectional view of a mirror, according to a first example embodiment of the invention, for an excimer laser.

FIG. 1 shows a cross-sectional view of a mirror for an excimer laser according to a first preferred embodiment of the invention. The mirror includes a substrate 11, a protective dielectric film 12, a metallic film 13, and a reflective dielectric film 14.

The substrate 11 may be any of various glass or crystalline materials. For example, the substrate 11 may be a precision-ground quartz glass, a synthetic quartz glass, or crystalline materials, such as fluorite or magnesium fluoride.

The protective dielectric film 12 is positioned between the metallic film 13 and the substrate 11 and acts as a protective layer to increase the durability of the mirror. The protective dielectric film 12 can be any of various substances having an optical thickness and that serve to improve adhesion between the substrate 11 and the metallic film 13 so that any tendency of the metallic film 13 to peel away from the substrate 11 is reduced compared to a configuration in which the metallic film 13 is applied directly to the substrate 11. The protective dielectric film 12 is preferably magnesium fluoride ($MgF_2$) having an optical-film thickness of $\lambda/2$ ($\lambda$=193.4 nm). The protective dielectric film 12 can be formed on the substrate 11 by vapor deposition, sputtering, or other technique well known in the art.

The metallic film 13 is preferably a metallic aluminum film having a film thickness of about 1500 Å.

The reflective dielectric film 14 comprises alternating layers (not shown) of high- and low-refractive index material. The high-refractive index material is preferably formed from neodymium fluoride ($NdF_3$), lanthanum fluoride ($LaF_3$), gadolinium fluoride ($GdF_3$), dysprosium fluoride ($DyF_3$), aluminum oxide ($Al_2O_3$), lead fluoride ($PbF_2$) and/or mixtures of these compounds. The low-refractive index material is preferably formed from magnesium fluoride ($MgF_2$), aluminum fluoride ($AlF_3$), sodium fluoride (NaF), lithium fluoride (LiF), calcium fluoride ($CaF_2$), barium fluoride ($BaF_2$), strontium fluoride ($SrF_2$), creolite ($Na_3AlF_6$), thiolite ($Na_5Al_3Fl_4$), and/or mixtures of these compounds.

The reflective dielectric film 14 has an alternating-layer structure defined by:

$$n_{1L}(n_{1H} \cdot n_{2L})^i \cdot n_{1H} \cdot n_{1L} \cdot n_{2H}(n_{3L} \cdot n_{3H})^j \cdot n_{3L} \cdot n_{2H}.$$

The relationships of the optical-film thicknesses for the alternating layers are as follows:

$$2n_{1L} \cdot d_{1L} = n_{1H} \cdot d_{1H} = n_{2L} \cdot d_{2L}$$

$$2n_{2H} \cdot d_{2H} = n_{3L} \cdot d_{3L} = n_{3H} \cdot d_{3H}$$

$$n_{1L} \cdot d_{1L} > n_{2H} \cdot d_{2H}$$

The terms $N_{1L}$, $n_{2L}$, and $n_{3L}$ denote the refractive indices of the low-refractive index layers, while $n_{1H}$, $n_{2H}$, and $n_{3H}$ denote the refractive indices of the high-refractive index layers. Each of the terms i, j is a positive integer denoting the respective coefficient of repetition of the alternating layers. The terms $n_{1L} \cdot d_{1L}$, $n_{1H} \cdot d_{1H}$, $n_{2L} \cdot d_{2L}$, $n_{2H} \cdot d_{2H}$, $n_{3L} \cdot d_{3L}$, and $n_{3H} \cdot d_{3H}$ denote the optical-film thicknesses for the layers having the refractive indices $n_{1L}$, $n_{1H}$, $n_{2L}$, $n_{2H}$, $n_{3L}$, and $n_{3H}$, respectively.

Preferably, the optical thickness $n_{1L} \cdot d_{1L}$ is between $(0.12)\lambda$ and $(0.15)\lambda$, the optical thicknesses $n_{1H} \cdot d_{1H}$ and $n_{2L} \cdot d_{2L}$ are between $(0.24)\lambda$ and $(0.30)\lambda$, the optical thickness $n_{2H} \cdot d_{2H}$ is between $(0.10)\lambda$ and $(0.12)\lambda$, and the optical thicknesses $n_{3L} \cdot d_{3L}$ and $n_{3H} \cdot d_{3H}$ are between $(0.20)\lambda$ and $(0.24)\lambda$, wherein $\lambda$ is the design center wavelength.

The optical-film thickness $n_{1L} \cdot d_{1L}$ is greater than $n_{2H} \cdot d_{2H}$ in order to suppress absorption of light and to obtain a wide high-reflectance band.

In the alternating-layered structure of the reflective dielectric film 14, the $n_{1L}(n_{1H} \cdot n_{2L})^i \cdot n_{1H} \cdot n_{1L}$ component reflects wavelengths from approximately 200 to 220 nm. The $n_{2H}(n_{3L} \cdot n_{3H})^j \cdot n_{3L} \cdot n_{2H}$ component reflects wavelengths from approximately 180 to 200 nm.

Using the general structure defined above, an example reflective dielectric film 14 is constructed as follows (wherein a slash mark indicates an inter-layer boundary):

$MgF_2$ (0.12~0.15λ)/[($NdF_3$(0.24~0.30λ)/$MgF_2$ (0.24~0.30λ)]$^p$/
$NdF_3$ (0.24~0.30λ)/$MgF_2$ (0.12~0.15λ)/$NdF_3$ (0.10~0.12λ)/
[$MgF_2$ (0.20~0.24λ)/$NdF_3$ (0.20~0.24λ)]$^q$/$MgF_2$ (0.20~0.24λ)/
$NdF_3$ (0.10~0.12λ)

ordinarily, the metallic film 13 is cold-formed on the protective dielectric film 12, and the reflective dielectric film 14 is cold-formed on the metallic film 13 in order to prevent oxidation of the metallic film 13. Forming the reflective dielectric film 14 can be performed under heating to strengthen the film. But, heating the reflective dielectric film 14 on the cold-formed metallic film 13 can cause oxidation of the metallic film 13 which can degrade the adhesion between the reflective dielectric film 14 and the metallic film 13. Consequently, it is preferable to form the metallic film 13 while heating the substrate 11 and to begin forming the reflective dielectric film 14 immediately afterward. In this way, it is possible to reduce oxidation of the metallic film 13 over time. In addition, a top-most protective film (not shown) may be applied as a low-refractive index layer with an optical-film thickness of that is an integer multiple of $\lambda/2$.

Figure 2:
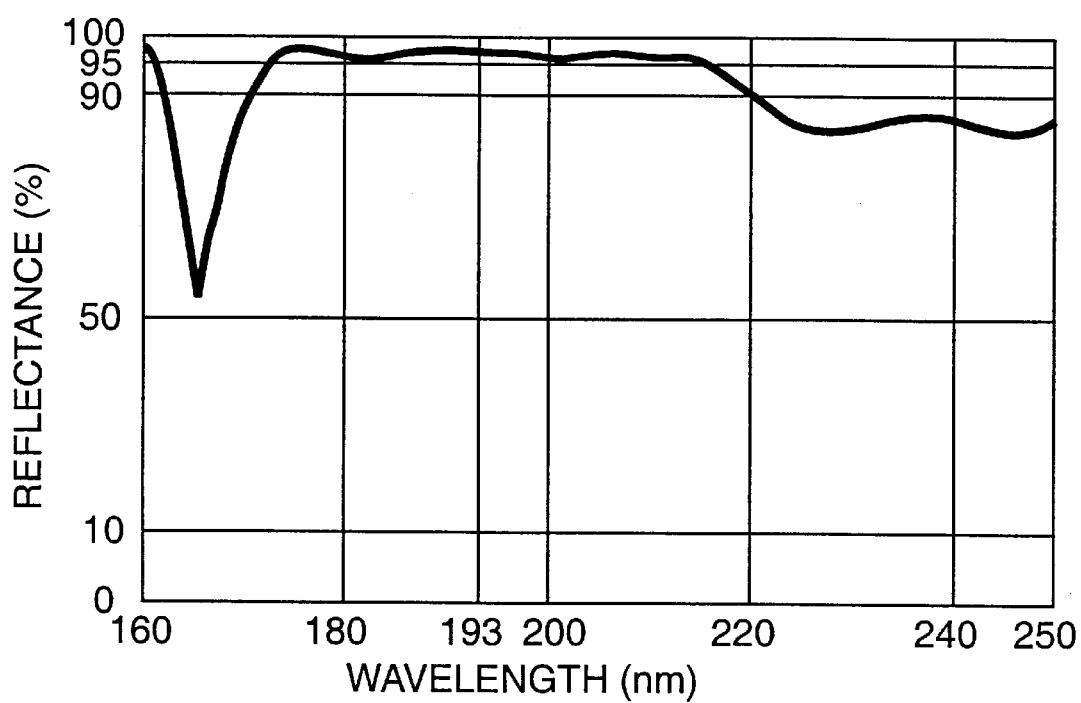
FIG. 2 is a graph of the reflectance characteristics of the mirror of FIG. 1.

FIG. 2 shows the spectral reflection characteristic at $\theta=0°$ (i.e., normal incidence) for the mirror of FIG. 1. The reflectance is over 95% in an approximately 40-nm reflection band within the wavelength range of 175 to 215 nm. Additionally, by changing the thickness of the alternating layers, a reflectance of over 95% can be obtained in any 40-nm band in the wavelength range of 160 to 300 nm. This is a significant improvement over prior-art mirrors that exhibit 95% reflectance for only a bandwidth of 20 nm. Also with respect to the FIG. 1 mirror, the reflectance also does not have significant-drop-off for any wavelength within the 40-nm band.

Figure 3:
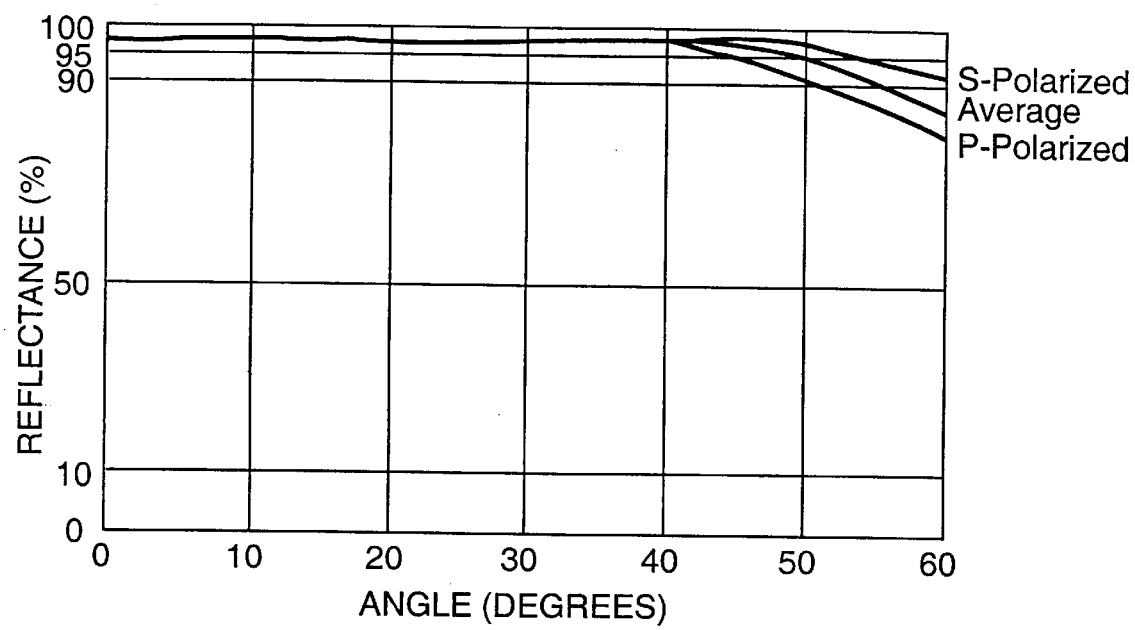
FIG. 3 is a graph of the incidence-angle characteristics of the mirror of FIG. 1 at a wavelength $\lambda$ of 193.4 nm.

FIG. 3 shows the incidence-angle characteristic at $\lambda=193.4$ nm for the mirror of FIG. 1. Over 95% reflectance is exhibited for either the s- or p-polarized light components at incident angles in the range of $\theta=0°$ to $45°$. This high-reflectance characteristic means that there is little difference between the s- and p-polarized light components of reflected light at significant angles of incidence. Additionally, irregularities in the brightness of an image formed after reflection are reduced.

Figure 4:
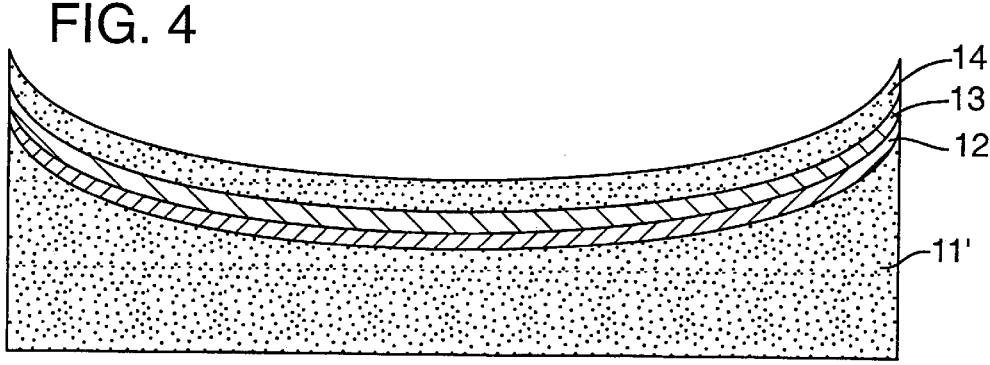
FIG. 4 is a cross-sectional view of an excimer laser mirror according to a second example embodiment of the present invention in which the mirror is concave.
Figure 11:
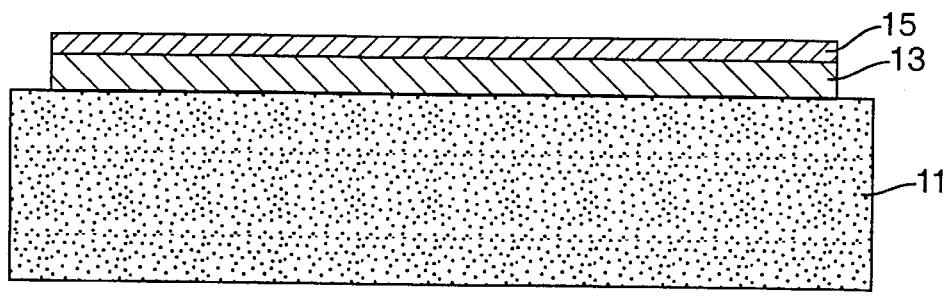
FIG. 11 is a cross-sectional view of a prior-art mirror used for excimer lasers.

FIG. 4 shows a second embodiment of the present invention. This mirror provides reflection characteristics similar to that already shown and described in relation to FIG. 1, but the FIG. 4 embodiment has a concave shape rather than a planar shape. The concave shape of the FIG. 4 mirror renders this mirror ideal for optical systems that previously had to employ conventional lenses, thereby achieving higher performance and a reduction in the number of lenses used in such systems.

Figure 5:
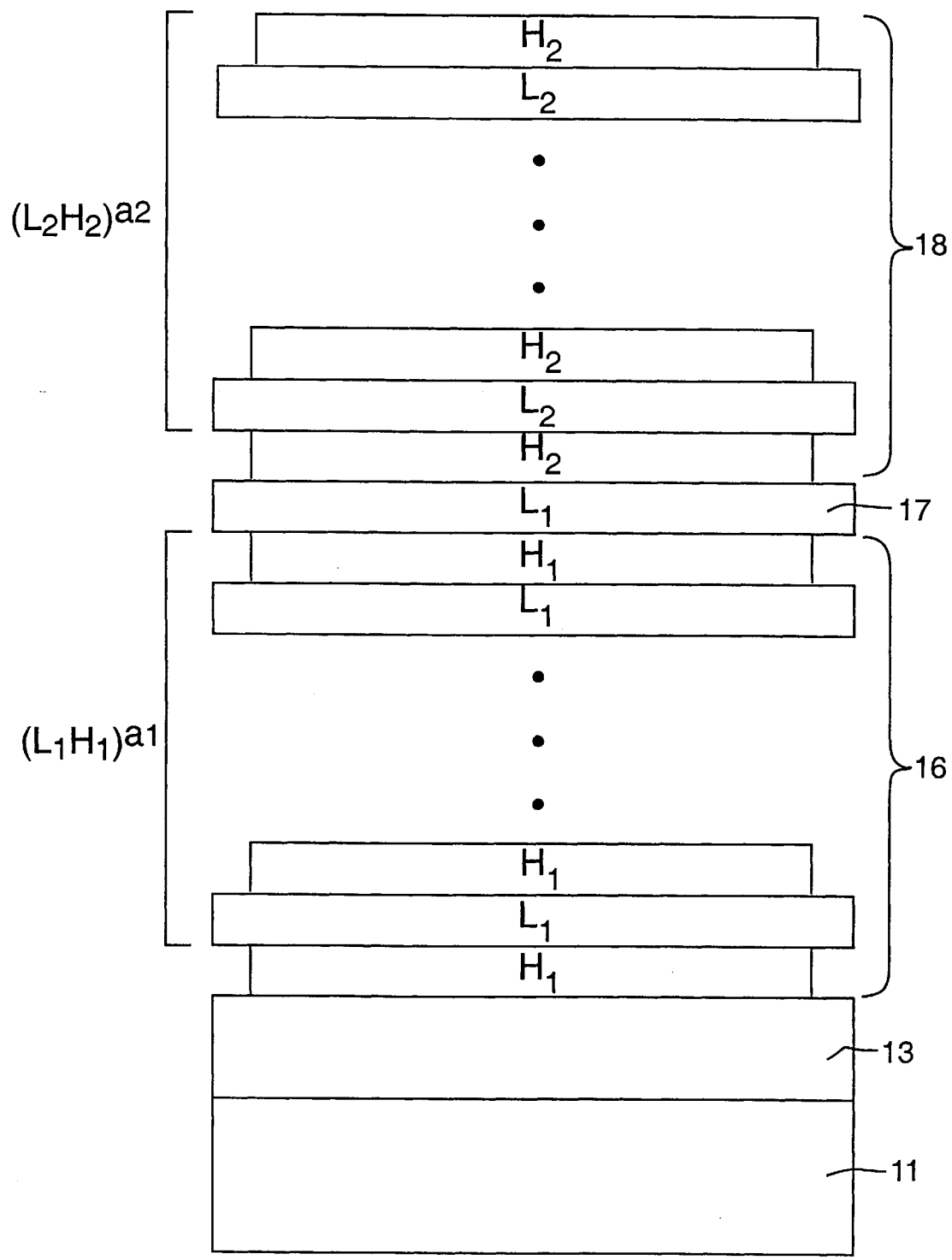
FIG. 5 is a cross-sectional-view of an excimer laser mirror according to a third example embodiment of the present invention wherein a dielectric film is formed from two groups of alternating layers of high- and low-refractive index material separated by a bonding layer.

FIG. 5 shows a third embodiment of the present invention. A substrate 11 and a metallic film 13 similar to those already described are positioned adjacent one another. A dielectric film is formed by two thin-film groups 16, 18 each comprising alternating layers of high- and low-refractive index material. The groups 16, 18 are separated from each other by an intervening bonding layer 17.

The groups 16, 18 are generally referred to as "thin-film" groups, and additional groups can be added to the FIG. 5 embodiment, as will be further described below. Any embodiment containing such groups (e.g., groups 16, 18) can be summarized generally by the following expression:

$$H_1(L_1H_1)^{a1}/L_1'/H_2(L_2H_2)^{a2}/ \ldots /L_{n-1}'/H_n(L_nH_n)^{an}$$

from the substrate side, and by the following relationships concerning the optical-film thicknesses:

$$X_1 > X_2 > \ldots > X_n$$

$$Y_1 > Y_2 > \ldots > Y_{n-1}$$

The terms $H_1, H_2, \ldots, H_n$ denote the high-refractive index layers in the first group, second group, and through the nth group. The terms $L_1, L_2, \ldots L_n$ denote the low-refractive index layers in the first group, second group, and through the nth group. The terms $L_1', L_2', \ldots, L_{n-1}'$ denote the bonding layers (that are preferably low-refractive index layers) in the first group, second group, and through the (n−1)th group. The exponents a1, a2, ..., an denote the coefficients of repetition of the alternating layers. The terms $X_1, X_2, \ldots$, $X_n$ denote the optical-film thicknesses of the various layers in the first group, second group, and through the nth group (the optical-film thicknesses of the various layers are the same within the same group). The terms $Y_1, Y_2, \ldots, Y_{n-1}$ denote the optical-film thicknesses of the first bonding layer, second bonding layer, and through the (n−1)th bonding layer.

The same material or different materials may be used in the high-refractive index layers and the same material or different materials may be used in the low-refractive index layers in the separate thin-film groups 16, 18. Similarly, if multiple bonding layers are present, they may be all the same material or of different materials. The same materials described for the FIG. 1 embodiment may be used for the substrate and the high- and low-refractive index layers. The high-refractive index layer is most preferably lanthanum fluoride ($LaF_3$) and the low-refractive index layer is most preferably magnesium fluoride ($MgF_2$). Like the FIG. 1 embodiment, aluminum is preferably used as the metallic film 13, preferably at a thickness of 1000 Å or greater.

The optical-film thickness of the various thin-film layers within each group 16, 18 decreases commensurately with the distance of the thin-film layer from the substrate. However, the optical-film thicknesses are preferably the same within the same group 16, 18.

Using the foregoing general expression, the FIG. 5 embodiment can be defined as follows:

$$\text{Substrate}/\text{Al}/H_1(L_1H_1)^{a1}/L_1'/H_2(L_2H_2)^{a2}$$

The relationship of the optical-film thicknesses of the layers is:

$$X_1 > X_2$$

The terms $H_1$ and $H_2$ denote the high-refractive index layers in the first group 16 and the second-group 18, respectively. The terms $L_1$ and $L_2$ denote the low-refractive index layers in the first group 16 and the second group 18, respectively. The term $L_1'$ denotes the first bonding layer 17 (low-refractive index layer). The terms a1 and a2 denote the coefficients of repetition for the alternating layers. The terms $X_1$ and $X_2$ denote the optical-film thicknesses of the various layers in the first group 16 and second group 18, respectively.

The layers are sequentially laminated onto a substrate 11 of, preferably, precision ground synthetic quartz by conventional methods, such as vacuum deposition or sputtering, to provide the following film composition:

$$\text{Quartz}/\text{Al } (1000 \text{ Å})/LaF_3(0.29\lambda)/[MgF_2(0.29\lambda)/LaF_3\ (0.29\lambda)]^4/ \\ MgF_2\ (0.27\lambda)/LaF_3\ (0.22\lambda)/[MgF_2\ (0.22\lambda)/LaF_3\ (0.22\lambda)]^4/\text{Air}$$

Figure 6:
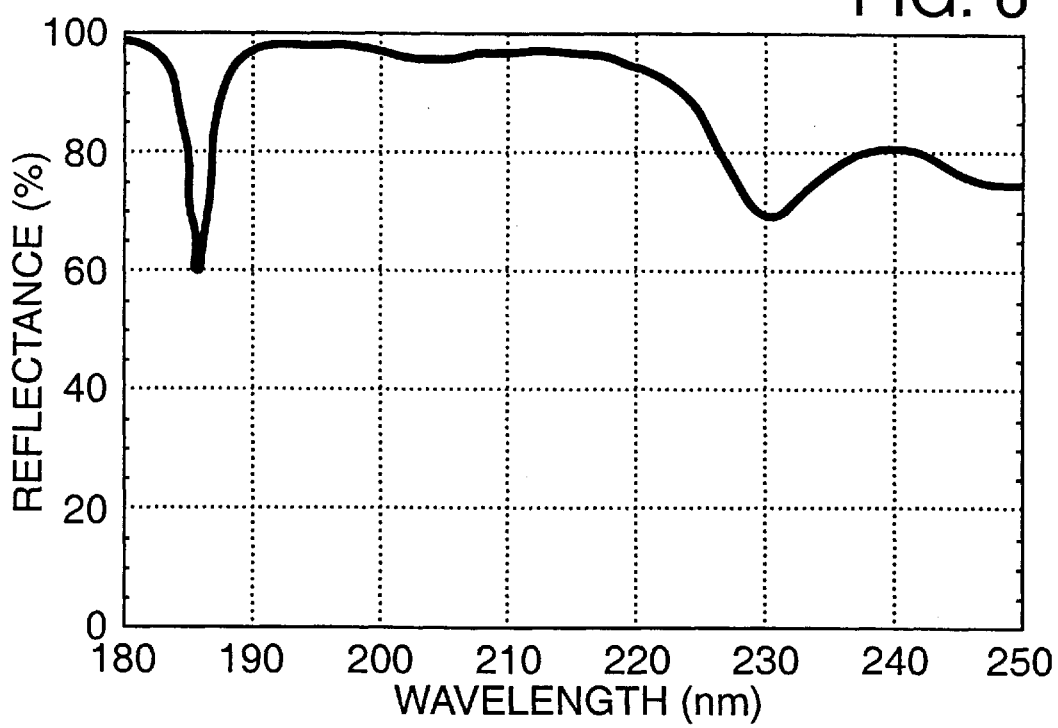
FIG. 6 is a graph of the reflectance characteristics of the mirror of FIG. 5.

FIG. 6 shows the spectral reflection characteristics for the mirror of FIG. 5 at θ=0°. The reflectance is over 95% in an approximately 30-nm reflection band in the range of wavelengths λ=190 to 220 nm.

Figure 7:
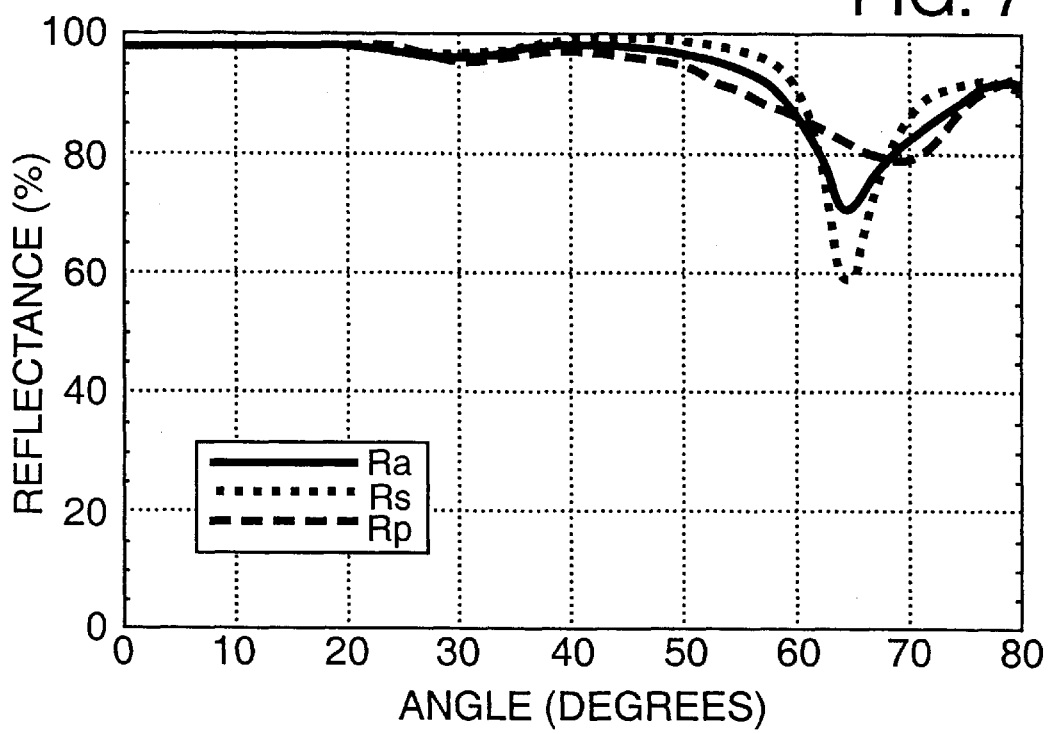
FIG. 7 is a graph of the incidence-angle characteristics of the mirror of FIG. 5 at a wavelength $\lambda$ of 193.4 nm.

FIG. 7 shows the incidence-angle characteristics for the mirror of FIG. 5 using a laser light of wavelength λ=193.4 nm. The reflectance of 95% or greater for both s- and p-polarized light components (Rs and Rp, respectively, and "Ra" is the average plot) can be maintained at incidence angles in the range of θ=0° to 50°.

Figure 8:
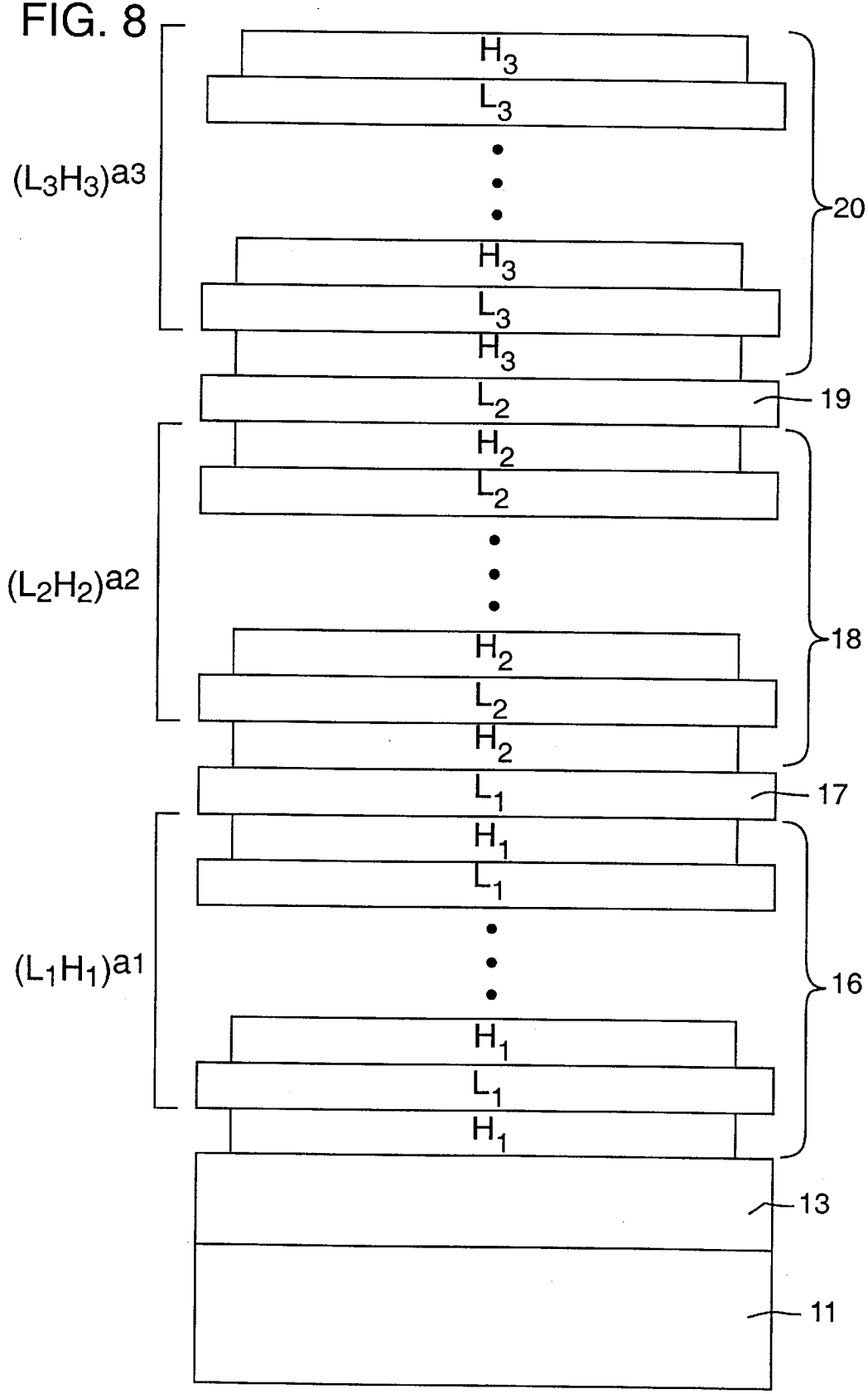
FIG. 8 is a cross-sectional view of an excimer laser mirror according to a fourth example embodiment of the present invention wherein the dielectric film is formed from three groups of alternating layers of high- and low-refractive index material, each group separated by a bonding layer.

FIG. 8 is a cross-sectional view of a fourth embodiment of a mirror similar to that already described in FIG. 5. In this case, however, a second bonding layer 19 and a third thin-film group 20 are shown. In this embodiment, the high-refractive index layer is preferably neodymium fluoride ($NdF_3$), the low-refractive index layer is preferably creolite ($Na_3AlF_6$) and the substrate 11 is preferably a precision-ground fluorite ($CaF_2$) These elements, together with the metallic aluminum (preferably) film 13 are sequentially laminated on the substrate 11.

Additionally, an intermediate layer (not shown), such as chromium (Cr) or a dielectric film, such as silicon oxide (SiO), may be inserted between the substrate 11 and the metallic layer 13 to improve adhesion.

The FIG. 8 embodiment can be defined by the expression:

$$\text{Substrate}/\text{Al}/H_1(L_1H_1)^{a1}/L_1/H_2(L_2H_2)^{a2}/L_2'/H_3(L_3H_3)^{a3}$$

The relationship of the optical-film thicknesses of the layers is:

$$X_1 > X_2 > X_3$$

$$Y_1 > Y_2$$

The terms $H_1$, $H_2$, and $H_3$ denote the high-refractive index layers in the first group 16, second group 18, and third group 20, respectively. The terms $L_1$, $L_2$, and $L_3$ denote the low-refractive index layers in the first group 16, second group 18, and third group 20, respectively. $L_1'$ and $L_2'$ denote the first bonding layer 17 and second bonding layer 19, respectively, both of which are preferably a low-refractive index layer. The terms a1, a2, and a3 denote the coefficients of repetition for the alternating layers. $X_1$, $X_2$, and $X_3$ denote the optical-film thicknesses of the various layers in the first group 16, second group 18, and third group 20, respectively (the optical-film thicknesses of the various layers are the same within the same group). $Y_1$ and $Y_2$ denote the optical-film thicknesses of the first bonding layer 17 and the second bonding layer 19.

The optical-film thickness of each bonding layer is preferably decreased with distance from the substrate. Additionally, the closer a thin-film group is to the substrate, the longer the wavelength of light reflected by it, and the closer a thin-film group is to the incidence medium, the shorter the wavelength of the light reflected by it.

An example for the FIG. 8 structure formed by conventional methods, such as vacuum deposition or sputtering, is as follows:

$$CaF_2/Cr/Al\ (1000\ \text{Å})/NdF_3\ (0.33\lambda)/[Na_3AlF_6\ (0.33\lambda)\ /NdF_3 \\ (0.33\lambda)]^2/Na_3AlF_6\ (0.24\lambda)/NdF_3\ (0.30\lambda)/[Na_3AlF_6\ (0.30\lambda)/ \\ NdF_3\ (0.30\lambda)]^2/Na_3AlF_6\ (0.24\lambda)/\ NdF_3\ (0.22\lambda)/[Na_3AlF_6 \\ (0.22\lambda)/NdF_3\ (0.22\lambda)]^2/\text{Air}$$

Figure 9:
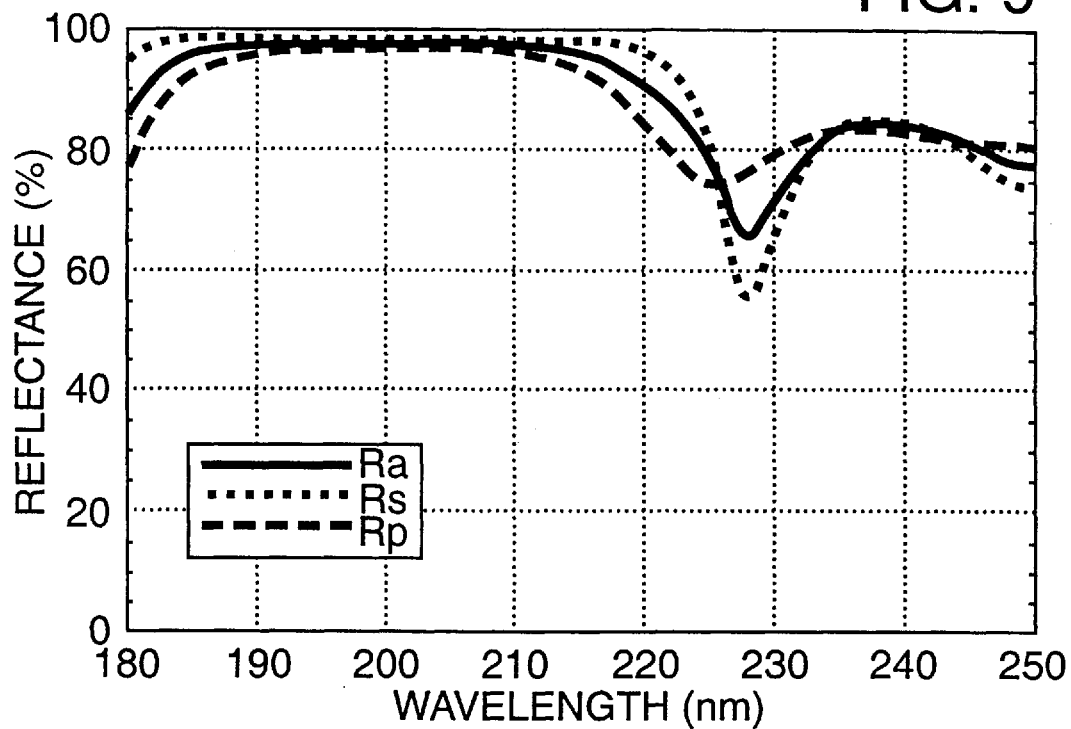
FIG. 9 is a graph of the reflectance characteristics of the mirror of FIG. 8.

FIG. 9 shows the spectral reflection characteristics at θ=45° for the mirror of FIG. 8. The reflectance is over 95% in an approximately 25-nm band (λ=188 nm to 213 nm) for the p-polarized light component (Rp), and in an approximately 40-nm band (λ=180 nm to 220 nm) for the s-polarized light component (Rs). (Average reflectance is the "Ra" plot.) Consequently, there is reflectance of 95% or greater in an approximately 30-nm reflection band of λ=185 nm to 215 nm.

Figure 10:
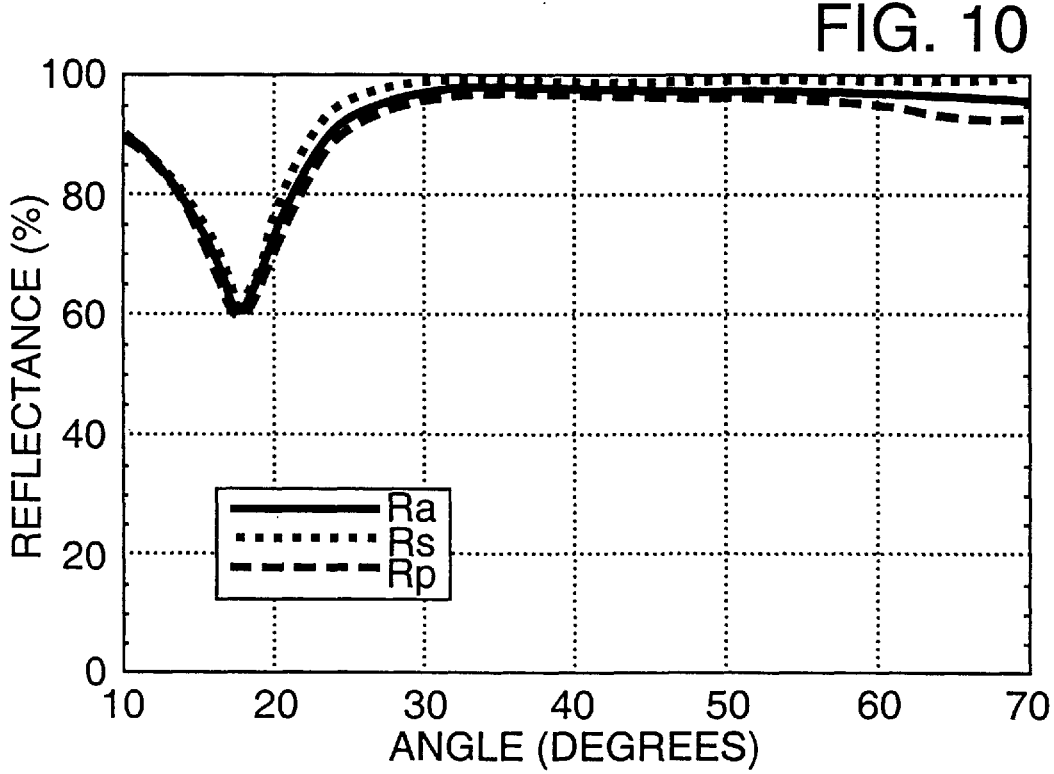
FIG. 10 is a graph of the incidence-angle characteristics of the mirror of FIG. 8 at a wavelength $\lambda$ of 193.4 nm.
Figure 12:
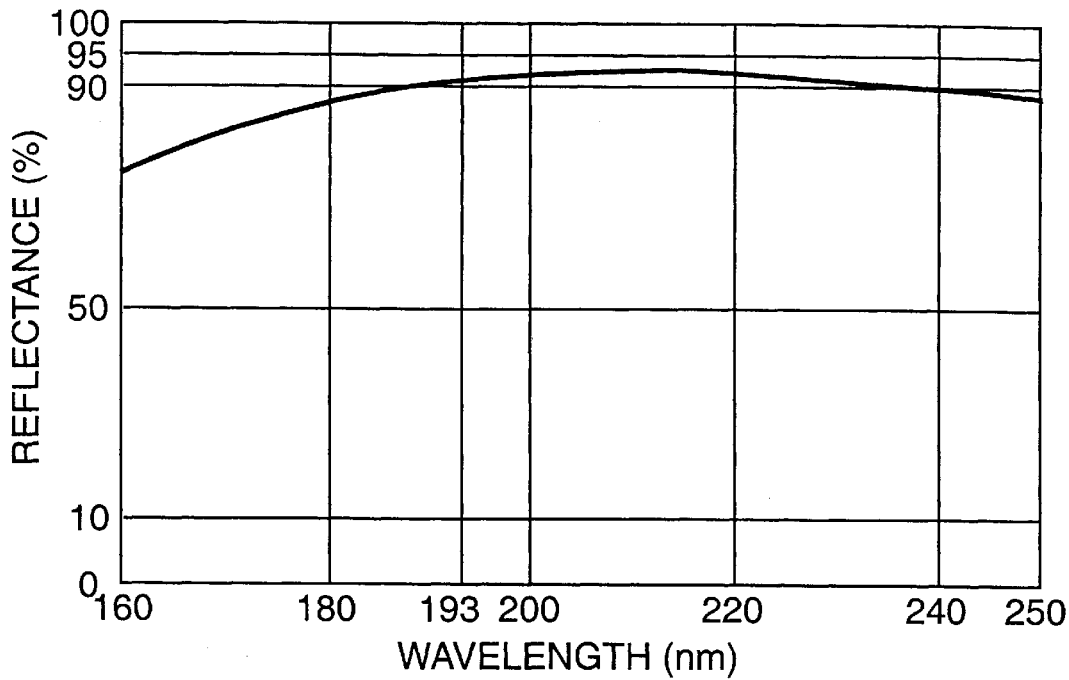
FIG. 12 is a graph of the reflectance characteristics of the prior-art mirror of FIG. 11.
Figure 13:
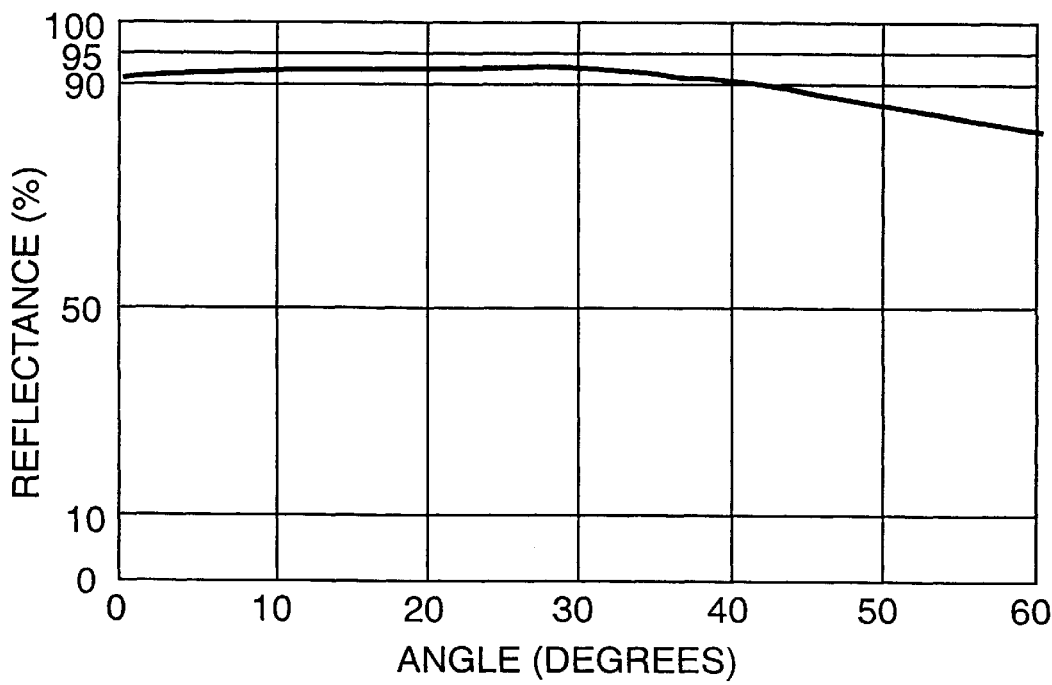
FIG. 13 is a graph of the incidence-angle characteristics at $\lambda$=193.4 nm for the prior-art mirror of FIG. 11.
Figure 14:
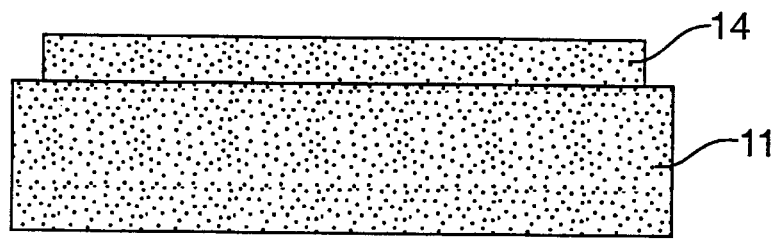
FIG. 14 is a cross-sectional view of another prior-art mirror used for excimer lasers.
Figure 15:
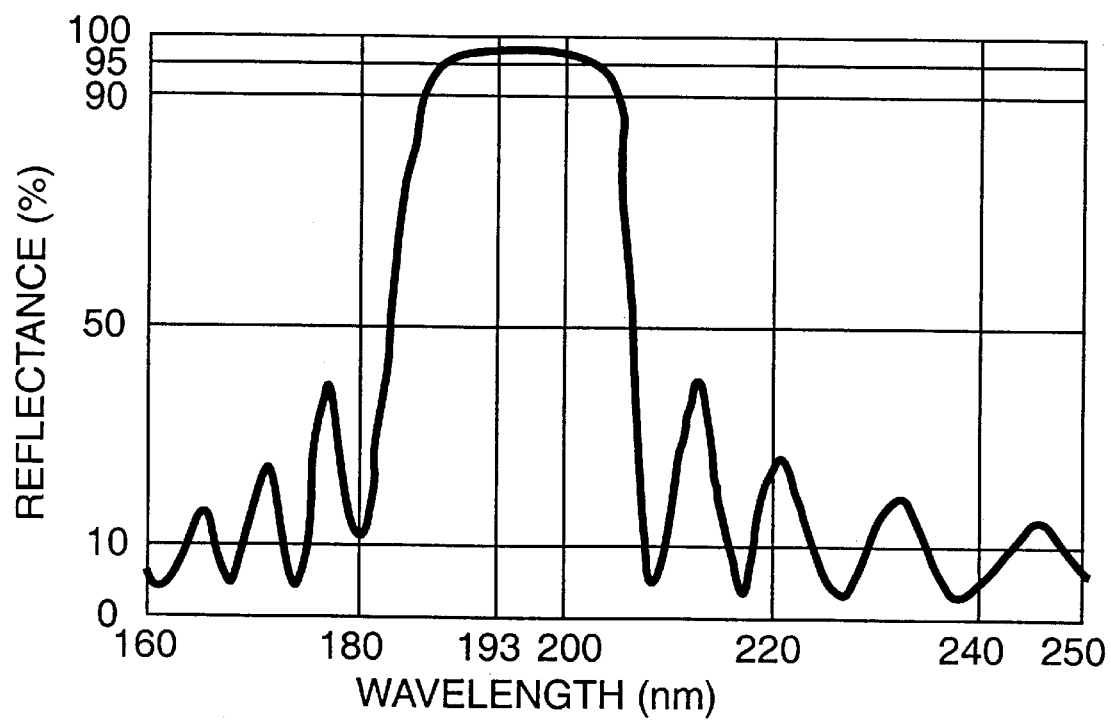
FIG. 15 is a graph of the reflectance characteristics of the prior-art mirror of FIG. 14.
Figure 16:
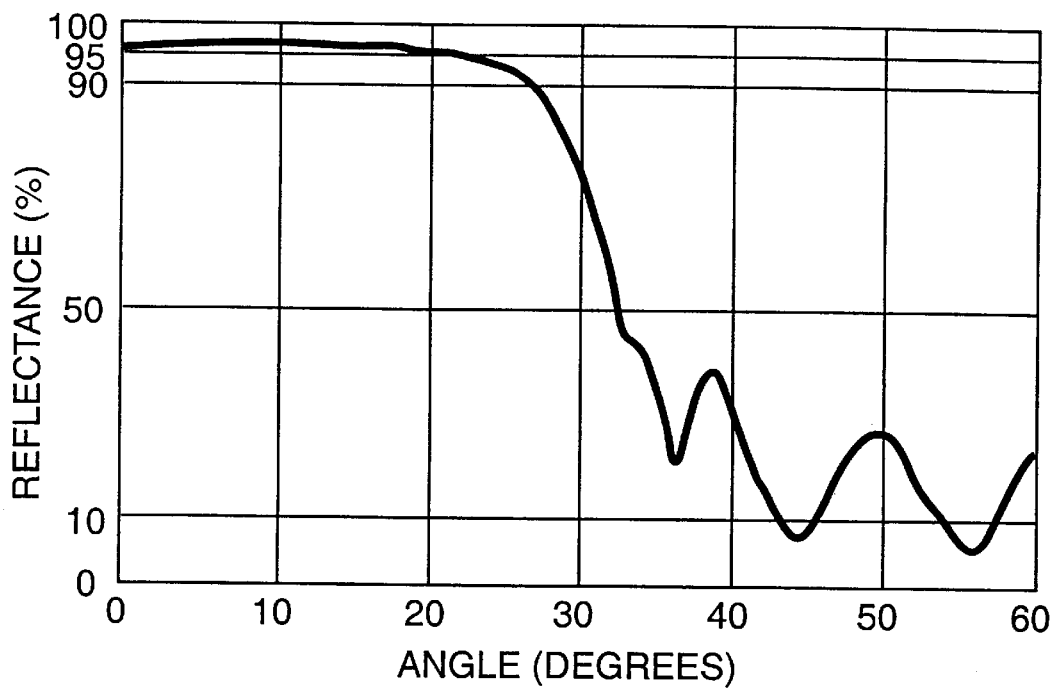
FIG. 16 is a graph of the incidence-angle characteristics at $\lambda$=193.4 nm for the prior-art mirror of FIG. 14.
Figure 17:
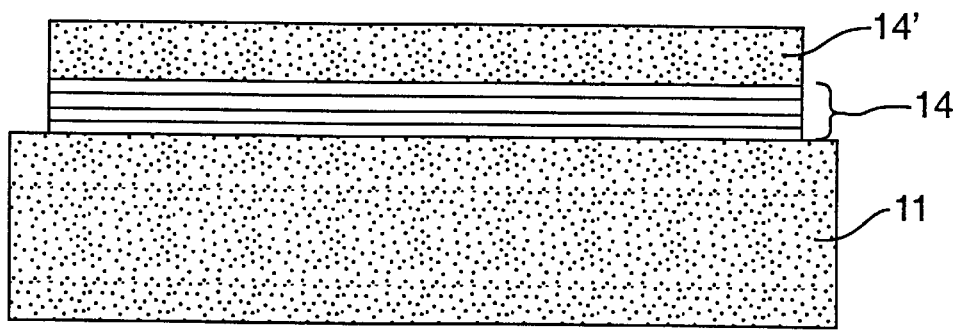
FIG. 17 is a cross-sectional view of another prior-art mirror used for excimer lasers.
Figure 18:
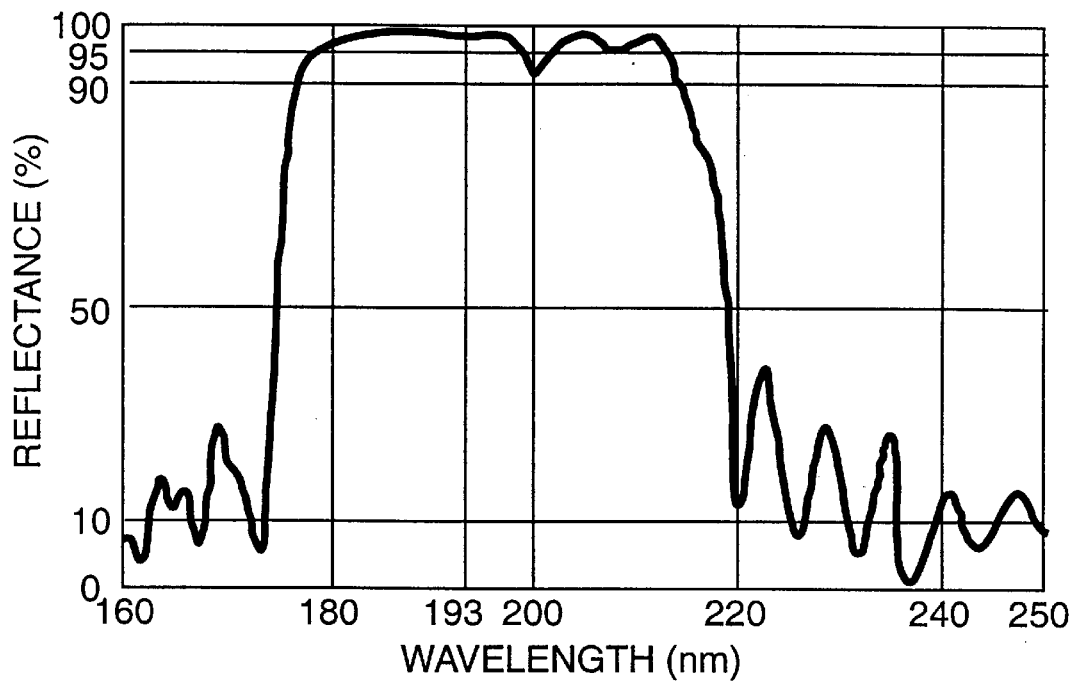
FIG. 18 is a graph of the reflectance characteristics of the prior-art mirror of FIG. 17.
Figure 19:
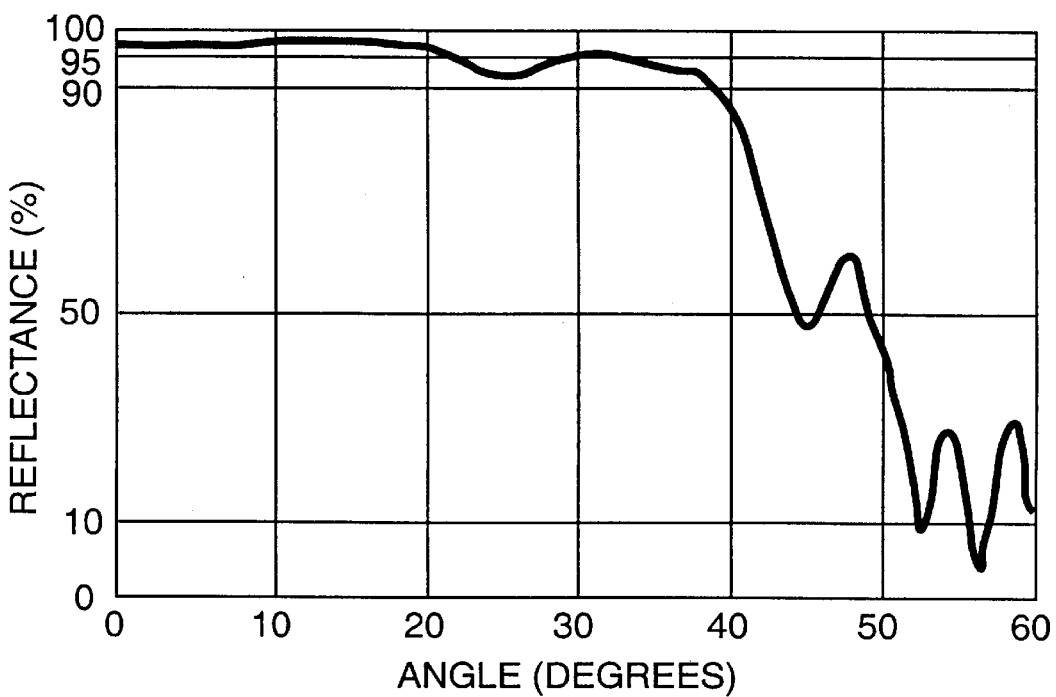
FIG. 19 is a graph of the incident angle characteristics at $\lambda$=193.4 nm of the prior-art mirror of FIG. 17.

FIG. 10 shows the incidence-angle characteristics for the mirror of FIG. 8 using a laser light of wavelength λ=193.4 nm. Notably, 95% or greater reflectance of both s- and p-polarized light components (Rs and Rp, respectively) are exhibited at incidence angles in the range of θ=30° to 60°. (Ra is the average plot.)

The mirrors of FIGS. 5 and 8 can be used in a reflecting optical system in which the angle of incidence is θ=0° to 50° (FIG. 5) or θ=30° to 60° (FIG. 8) with minimal loss and irregularities in the intensity of reflected light. If the mirror is, for example, utilized as an optical element of a semiconductor manufacturing device (e.g., stepper) that uses an excimer laser as the light source, more efficient processing is achieved with superior exposure accuracy. Also, the embodiments of FIGS. 5 and 8 need not be planar in order to provide the same performance as planar configurations. For example, a concave profile results in a higher performance and a reduction in the number of lenses required when applied in optical systems that otherwise comprise only conventional lenses.

In all the embodiments of the present invention, the multiple laminated dielectric films reflect the excimer laser light, thereby reducing the amount of light reaching the underlying metallic film. As a result, damage to the metallic film is reduced. In addition, since the laser durability of the laminated dielectric film is generally superior to that of the metallic film, a mirror according to this invention has superior laser durability over past metallic reflector mirrors. Improved laser durability is also provided by forming a λ/2 low-refractive index layer as the topmost layer having a film thickness that minimizes loss of optical characteristics, and which is a material with superior laser durability.

Even higher performance is achieved if the mirror according to the invention is used as an optical element in a device that operates using ultraviolet light and an excimer laser. Irregularities in brightness due to differences in the polarized light components of the reflected light, in particular, can be kept to a minimum in images formed using a mirror of this invention.

Whereas the invention has been described in connection with multiple example embodiments, it will be understood that the invention is not limited to those embodiments. On the contrary, the invention is intended to encompass all alternatives, modifications, and equivalents as may be included within the spirit and scope of the invention as defined by the appended claims.

What is claimed is:

1. A mirror for reflecting high-intensity ultraviolet light, comprising:

a substrate;

a dielectric film comprising alternating layers of high- and low-refractive index material each having a refractive index and an optical-film thickness; and a metallic film situated between the substrate and the dielectric film, the dielectric film having a film composition defined as $n_{1L}(n_{1H} \cdot n_{2L})^i \cdot n_{1H} \cdot n_{1L} \cdot n_{2H}(n_{3L} \cdot n_{3H})^j \cdot n_{3L} \cdot n_{2H}$, wherein $n_{1L}$, $n_{2L}$, and $n_{3L}$ denote refractive indices of the low-refractive index layers; $n_{1H}$, $n_{2H}$, and $n_{3H}$ denote refractive indices of the high-refractive index layers; and i, j are each independently a positive integer denoting a respective coefficient of repetition for the alternating layers.

2. The mirror of claim 1, further comprising a second dielectric film situated between the metallic film and the substrate.

3. The mirror of claim 1, wherein:

the alternating layers have a relationship of optical-film thicknesses defined as $$2n_{1L} \cdot d_{1L} = n_{1H} \cdot d_{1H} = n_{2L} \cdot d_{2L}$$

$$2n_{2H} \cdot d_{2H} = n_{3L} \cdot d_{3L} = n_{3H} \cdot d_{3H}$$

wherein $n_{1L} \cdot d_{1L}$, $n_{1H} \cdot d_{1H}$, $n_{2L} \cdot d_{2L}$, $n_{2H} \cdot d_{2H}$, $n_{3L} \cdot d_{3L}$, and $n_{3H} \cdot d_{3H}$ denote optical-film thicknesses of layers having refractive indices $n_{1L}$, $n_{1H}$, $n_{2L}$, $n_{2H}$, $n_{3L}$, and $n_{3H}$, respectively.

4. The mirror of claim 3 wherein the optical thickness of $n_{1L} \cdot d_{1L}$ is greater than $n_2 \cdot d_{2H}$.

5. The mirror of claim 3 wherein:

the optical thickness defined by $n_{1L} \cdot d_{1L}$ is (0.12)λ to (0.15)λ;

the optical thicknesses defined by $n_{1H} \cdot d_{1H}$ and $n_{2L} \cdot d_{2L}$ are each (0.24)λ to (0.30)λ;

the optical thickness defined by $n_{2H} \cdot d_{2H}$ is (0.10)λ to (0.12)λ;

the optical thicknesses defined by $n_{3L} \cdot d_{3L}$ and $n_{3H} \cdot d_{3L}$ are each (0.20)λ to (0.24)λ; and wherein λ is the design center wavelength.

6. The mirror of claim 1, wherein the high-refractive index material is selected from a group consisting of neodymium fluoride, lanthanum fluoride, gadolinium fluoride, dysprosium fluoride, aluminum oxide, lead fluoride, and mixtures thereof.

7. The mirror of claim 1, wherein the low-refractive index material is selected from a group consisting of magnesium fluoride, aluminum fluoride, sodium fluoride, lithium fluoride, calcium fluoride, barium fluoride, strontium fluoride, creolite, thiolite, and mixtures thereof.

8. The mirror of claim 7 wherein the high-refractive index material is selected from a group consisting of neodymium fluoride, lanthanum fluoride, gadolinium fluoride, dysprosium fluoride, aluminum oxide, lead fluoride, and mixtures thereof.

9. The mirror of claim 1, wherein the dielectric film is defined as:

$$MgF_2 \ (0.12\sim0.15\lambda)/[(NdF_3 \ (0.24\sim0.30\lambda)/MgF_2 \ (0.24\sim0.30\lambda)]^p/ NdF_3 \ (0.24\sim0.30\lambda)/MgF_2 \ (0.12\sim0.15\lambda)/NdF_3 \ (0.10\sim0.12\lambda)/ [MgF_2 \ (0.20\sim0.24\lambda)/NdF_3 \ (0.20\sim0.24\lambda)]^q/MgF_2 \ (0.20\sim0.24\lambda)/ NdF_3(0.10\sim0.12\lambda).$$

10. The mirror of claim 1, wherein the optical thickness of the alternating layers decreases with distance from the substrate.

11. A mirror for reflecting high-intensity ultraviolet light, comprising:

a substrate;

a dielectric film comprising alternating layers of high- and low-refractive index material: and a metallic film situated between the substrate and the dielectric film, wherein the dielectric film comprises a first group of alternating thin-film layers, a second group of alternating thin-film layers, and a bonding layer situated between the first and second groups.

12. The mirror of 11, wherein the dielectric film further comprises a third group of alternating thin-film layers and a second bonding layer between the second and third groups.

13. The mirror of claim 11, wherein the alternating thin-film layers within any group all have the same optical thickness.

14. The mirror of claim 11, wherein:

the first group of alternating thin-film layers is situated closer to the substrate than the second group, and the optical thicknesses of the alternating thin-film layers in the first group are greater than the optical thicknesses of the alternating thin-film layers in the second group.

15. A mirror for reflecting high-intensity ultraviolet light, comprising:

a substrate;

a dielectric film comprising alternating layers of high- and low-refractive index material; and a metallic film situated between the substrate and the dielectric film, wherein the dielectric film comprises n groups of alternating thin-film layers, the groups being separated by bonding layers, and the alternating layers having film compositions that are defined by:

$$H_1(L_1H_1)^{a1}/L_1'/H_2(L_2H_2)^{a2}/ \ldots /L_{n-1}'/H_n(L_nH_n)^{an}$$

wherein $H_1$ through $H_n$ denote high-refractive index layers in a first group through an nth group; $L_1$ through $L_n$ denote low-refractive index layers in the first group through the nth group; $L_1'$ through $L_{n-1}'$ denote bonding layers in the first group through the (n−1)th group; and a1 through an denote coefficients of repetition of the alternating layers.

16. The mirror of claim 15, wherein the alternating layers in the groups have an optical-film thickness defined by:

$$X_1 > X_2 > \ldots > X_n$$

$$Y_1 > Y_2 > \ldots > Y_{n-1},$$

wherein $X_1$ through $X_n$ denote optical-film thicknesses of the various layers in the first group through the nth group; and $Y_1$ through $Y_{n-1}$ denote optical-film thicknesses of the first bonding layer through the (n−1)th bonding layer.

17. The mirror of claim 16, wherein the optical-film thickness of each bonding layer decreases with distance from the substrate.

18. The mirror of claim 16, wherein the optical-film thickness of the thin-film layers within each group are substantially equal, but the optical-film thickness of each group decreases with increased distance of the group from the substrate.

19. A mirror for an excimer laser, comprising:

(a) a substrate;

(b) a dielectric film comprising alternating layers of high- and low-refractive index material;

(c) a metallic film situated between the substrate and the dielectric film;

(d) each of the alternating layers having a refractive index and an optical-film thickness;

(e) the alternating layers having a film composition defined as $n_{1L} \; (n_{1H} \cdot n_{2L})^i \cdot n_{1H} \cdot n_{1L} \cdot n_{2H}(n_{3L} \cdot n_{3H})^j \cdot n_{3L} \cdot n_{2L}$, wherein $n_{1L}$, $n_{2L}$, and $n_{3L}$ denote refractive indices of the low-refractive index layers; $n_{1H}$, $n_{2H}$, and $n_{3H}$ denote refractive indices of the high-refractive index layers; and i and j are each independently a positive integer denoting a respective coefficient of repetition for the alternating layers; and (f) the alternating layers having a relationship of optical-film thicknesses defined as $$2n_{1L} \cdot d_{1L} = n_{1H} \cdot d_{1H} = n_{2L} \cdot d_{2L}$$

$$2n_{2H} \cdot d_{2H} = n_{3L} \cdot d_{3L} = n_{3H} \cdot d_{3H}$$

wherein $n_{1L} \cdot d_{1L}$, $n_{1H} \cdot d_{1H}$, $n_{2L} \cdot d_{2L}$, $n_{2H} \cdot d_{2H}$, $n_{3L} \cdot d_{3L}$, and $n_{3H} \cdot d_{3H}$ denote optical-film thicknesses of film structures $n_{1L}$, $n_{1H}$, $n_{2L}$, $n_{2H}$, $n_{3L}$, and $n_{3H}$, respectively.

20. A mirror for an excimer laser, comprising:

(a) a substrate;

(b) a dielectric film comprising alternating layers of high- and low-refractive index material;

(c) a metallic film situated between the substrate and the dielectric film;

(d) each of the alternating layers having a refractive index and an optical-film thickness;

(e) the dielectric film comprising groups of alternating thin-film layers, each group separated from adjacent groups by a bonding layer, the film compositions of the alternating layers being defined by $$H_1(L_1H_1)^{a1}/L_1'/H_2(L_2H_2)^{a2}/ \ldots /L_{n-1}'/H_n(L_nH_n)^{an}$$

wherein $H_1$ through $H_n$ denote high-refractive index layers in a first group through an nth group; $L_1$ through $L_n$ denote low-refractive index layers in the first group through the nth group; $L_1'$ through $L_{n-1}'$ denote bonding layers in the first group through the (n−1)th group; a1 through an denote coefficients of repetition of the alternating layers; wherein each of the alternating layers has an optical-film thickness defined by $$X_1 > X_2 > \ldots > X_n$$

$$Y_1 > Y_2 > \ldots > Y_{n-1}$$

wherein $X_1$ through $X_n$ denote optical-film thicknesses of the thin-film layers in the first group through the nth group; and $Y_1$ through $Y_{n-1}$ denote optical-film thicknesses of the first bonding layer through the (n−1)th-bonding layer.

21. An optical system, comprising:

(a) a source of a beam of intense ultraviolet light; and (b) a mirror as recited in claim 1, the mirror being oriented to reflect the beam produced by the source.

22. The system of claim 21, wherein the source is an excimer laser.

23. An optical system, comprising:

(a) an excimer laser; and (b) a mirror as recited in claim 19, the mirror being oriented to reflect a beam of ultraviolet light produced by the excimer laser.

24. An optical system, comprising:

(a) an excimer laser; and (b) a mirror as recited in claim 20, the mirror being oriented to reflect a beam of ultraviolet light produced by the excimer laser.

* * * * *

UNITED STATES PATENT AND TRADEMARK OFFICE
CERTIFICATE OF CORRECTION

PATENT NO. : 5,850,309

DATED : December 15, 1998

INVENTOR(S) : Shirai et al.

It is certified that error appears in the above-identified patent and that said Letters Patent is hereby corrected as shown below:

Column 1, line 64, "of." should be --of--.

Column 5, line 26, "$N_{1L}$" should be --$n_{1L}$--.

Column 7, line 49, "methods,." should be --methods,--.

Column 8, line 5, insert a period --.-- after "($CaF_2$)" and before "These".

Column 10, line 21, claim 6, delete the hyphen "-" after "and".

Column 10, line 47, claim 11, replace the colon ":" with a semicolon --;--.

Column 10, line 54, claim 12, insert --claim-- after "of" and before "11".

Signed and Sealed this

Thirtieth Day of May, 2000

Attest:

Q. TODD DICKINSON

*Attesting Officer*    *Director of Patents and Trademarks*